(12) United States Patent
Dekel et al.

(10) Patent No.: US 8,077,959 B2
(45) Date of Patent: Dec. 13, 2011

(54) STAIN-BASED OPTIMIZED COMPRESSION OF DIGITAL PATHOLOGY SLIDES

(75) Inventors: Shai Dekel, Ramat Hasharon (IL); Leon Google, Herzelia (IL)

(73) Assignee: General Electric Company, Schenectady, NY (US)

( * ) Notice: Subject to any disclaimer, the term of this patent is extended or adjusted under 35 U.S.C. 154(b) by 37 days.

(21) Appl. No.: 12/570,290

(22) Filed: Sep. 30, 2009

(65) Prior Publication Data

US 2011/0075897 A1    Mar. 31, 2011

(51) Int. Cl.
*G06K 9/00* (2006.01)
*G06K 9/36* (2006.01)
(52) U.S. Cl. ......... 382/133; 382/128; 382/166; 382/232
(58) Field of Classification Search .................. 382/128, 382/166, 133, 232
See application file for complete search history.

(56) References Cited

U.S. PATENT DOCUMENTS

| | | | |
|---|---|---|---|
| 6,577,754 B2 | 6/2003 | Stone et al. | |
| 6,754,383 B1 | 6/2004 | Payton | |
| 6,819,787 B2 * | 11/2004 | Stone et al. | 382/133 |
| 6,944,333 B2 | 9/2005 | Douglass | |
| 7,181,076 B1 | 2/2007 | Payton | |
| 7,187,798 B1 | 3/2007 | Payton | |
| 2004/0258301 A1 | 12/2004 | Payton | |

OTHER PUBLICATIONS http://www.bcm.edu/rosenlab/protocols/HEstaining.pdf, Rosen Lab, Department of Molecular and Cellular Biology, Baylor College of Medicine, Step by step protocol of H&E stain, Aug. 29, 2005.
http://en.wikipedia.org/wiki/Staining_(biology), "H&E stain", Sep. 21, 2009.
http://en.wikipedia.org/wiki/Haematoxylin_and_eosin_stain, "Staining", Sep. 22, 2009.
Karhunen-Loeve Transform (KLT), Web lectures of Harvey Mudd College: http://fourier.eng.hmc.edu/e161/lectures/klt/node3.html, Nov. 10, 2007.
Shlens J, "A Tutorial on Principal Component Analysis", Systems Neurobiology Laboratory, Salk Insitute for Biological Studies and Institute for Nonlinear Science, University of California, Dec. 10, 2005.
Pearson, K. "On Lines and Planes of Closest Fit to Systems of Points in Space", Philosophical Magazine 2 (6): 559-572, 1901.
Smith L I. "A tutorial on PCA", Lectures of Otago University, Computer Science, Feb. 26, 2002.

* cited by examiner

*Primary Examiner* — John Strege
(74) *Attorney, Agent, or Firm* — Howard Zaretsky, Esq.; Woods Oviatt Gilman LLP

(57) ABSTRACT

A novel and useful method and system of optimized image compression of digital pathology slide images. The optimized image compression mechanism exploits the special color properties of the stained tissue represented by the digital pathology slides and provides an image compression algorithm having improved rate-distortion performance. Optimized color transforms are pre-computed using training sets of pathology slide image scan data for each stain type. The optimized color transforms are used to compress input slide image scans resulting in more efficient image streaming enabling users to review extremely large digital slide scans from any connected location, such as in a hospital, satellite center, home or on a mobile telephone.

21 Claims, 14 Drawing Sheets

| QUANTIZATION PARAMS, QSTEP | | | YCbCr | | | | | | | QUANTIZATION PARAMS, QSTEP | | | PCA | | | | | | |
|---|---|---|---|---|---|---|---|---|---|---|---|---|---|---|---|---|---|---|---|
| | | | COMPONENTS SIZE, KB | | | RATE-DISTORTION PARAMS, | | | | | | | COMPONENTS SIZE | | | RATE-DISTORTION PARAMS, | | | DELTA PSNR |
| Y | Cb | Cr | Y | Cb | Cr | TOTAL SIZE | Bpp | PSNR | | FIRST | SECOND | THIRD | FIRST | SECOND | THIRD | TOTAL SIZE | Bpp | PSNR | |
| FILE NAME: CASE 1 | | | | | | | | | | | | | | | | | | | |
| 0.02 | 0.04 | 0.04 | 375 | 40 | 42 | 457 | 1.74 | 38.20 | | 0.0245 | 0.029 | 0.044 | 362 | 71 | 31 | 464 | 1.76 | 38.54 | 0.33 |
| 0.05 | 0.1 | 0.1 | 98 | 14 | 11 | 123 | 0.47 | 34.44 | | 0.063 | 0.064 | 0.098 | 90 | 26 | 10 | 126 | 0.48 | 34.77 | 0.33 |
| FILE NAME: CASE 2 | | | | | | | | | | | | | | | | | | | |
| 0.02 | 0.04 | 0.04 | 325 | 38 | 39 | 402 | 1.84 | 37.97 | | 0.0245 | 0.029 | 0.044 | 310 | 66 | 27 | 403 | 1.84 | 38.37 | 0.40 |
| 0.05 | 0.1 | 0.1 | 95 | 12 | 10 | 117 | 0.53 | 34.12 | | 0.063 | 0.064 | 0.098 | 86 | 25 | 7 | 118 | 0.54 | 34.53 | 0.41 |

FIG.17

STAIN-BASED OPTIMIZED COMPRESSION OF DIGITAL PATHOLOGY SLIDES

FIELD OF THE INVENTION

The subject matter disclosed herein relates to the field of digital imaging, and more particularly relates to a mechanism for stain-based optimized compression of digital pathology slide scans.

BACKGROUND OF THE INVENTION

Pathology is the study and diagnosis of diseases by examining body tissues, typically under magnification. Currently, pathologists manually review stained tissue samples on glass slides under an optical microscope to render a diagnosis. Tissue samples are typically prepared with stains by a specialist called a histotechnician. Today, pathologists use an optical microscope to look at slides of tissue samples. This process has not changed much in over 100 years. Due to this manual process, the initial diagnosis and subsequent second opinions may be delayed as the correct slides must be physically delivered to the proper pathologist.

Digitizing the tissue sample images enables easier and faster evaluation without the organization, shipment and management of glass slides. Using digital pathology techniques will speed turnaround time and improve pathologists' overall diagnostic processes. In light of mounting healthcare cost pressures and the pervasive need to digitize a patient's medical record place such techniques and solutions in high demand. This area of digital pathology is known as Whole Slide Imaging (WSI) in which entire slides are digitally scanned so that they can be viewed on a computer.

The technology includes the steps of scanning the glass slides that have prepared tissue on them. Since the scanning of the slides is performed at very high resolution, the uncompressed digital output of a slide typically has a very large size, e.g., 10 to 30 GB representing an image that is approximately 40,000 by 40,000 pixels.

The next step in the whole slide imaging scheme is to compress the digital slides. In order to effectively store and stream the digital images, the digital slides must be compressed using lossy compression techniques. The compression algorithm used preferably exhibits high rate-distortion performance, i.e. strong compression with high visual quality. Once compressed, the digital slide images are stored on an image server and streamed to a client viewer located anywhere.

A problem arises in that digital pathology slide images contain significant visual content. This makes the slide images difficult to compress well while maintaining high visual quality at the same time.

Thus, there is a need for an optimized image compression mechanism that is capable of compressing large digital pathology slide images with considerable visual content while maintaining high visual quality.

BRIEF DESCRIPTION OF THE INVENTION

There is thus provided in accordance with the invention, a method of image compression, the method comprising the steps of pre-computing a plurality of color transforms, each color transform computed in accordance with a set of training images and compressing a digital image utilizing one of the color transforms.

There is also provided in accordance with the invention, a method of compressing digital pathology stained images, the method comprising the steps of pre-computing a plurality of color transforms, each color transform computed in accordance with a set of training slide images corresponding to a particular stain, mapping an input digital image to a particular stain and compressing the input digital image utilizing a pre-computed color transform corresponding to the mapped stain.

There is further provided in accordance with the invention, a server computer for performing image compression of digital pathology slide scans comprising an image storage device adapted to store a plurality of pathology slide scans and an image compression module for mapping an input slide scan digital image to a particular stain and compressing the input digital image utilizing a pre-computed color transform corresponding to the mapped stain, wherein color transforms are pre-computed, each color transform computed in accordance with a set of training images corresponding to a particular stain.

There is also provided in accordance with the invention, a method of computing optimized color transforms for use in compressing digital pathology slide scans, the method comprising the steps of receiving sample stain data from a set of training slide scans representative of a particular histochemistry staining method of a particular tissue type and forming an input vector therefrom and for each training slide set, calculating a color transform utilizing the input vector and storing the resulting matrix coefficients in a database, The method according to claim 16, wherein the color transforms are computed using principle component analysis (PCA).

There is further provided in accordance with the invention, a computer program product characterized by that upon loading it into computer memory a digital pathology stained image compression process is executed, the computer program product comprising a computer usable medium having computer usable program code embodied therewith, the computer usable program code comprising computer usable code configured to pre-compute a plurality of color transforms, each color transform computed in accordance with a set of training slide images corresponding to a particular stain, computer usable code configured to map an input digital image to a particular stain and computer usable code configured to compress the input digital image utilizing a pre-computed color transform corresponding to the mapped stain.

BRIEF DESCRIPTION OF THE DRAWINGS

The invention is herein described, by way of example only, with reference to the accompanying drawings, wherein:

FIG. 17 is a table comparing rate-distortion performance for YCbCr and PCA transforms.

DETAILED DESCRIPTION OF THE INVENTION

Notation Used Throughout

The following notation is used throughout this document:

| Term | Definition |
| --- | --- |
| ASCII | American Standard Code for Information Interchange |
| ASIC | Application Specific Integrated Circuit |
| CAD | Computer Aided Design |
| CDROM | Compact Disc Read Only Memory |
| CPU | Central Processing Unit |
| DCT | Discrete Cosine Transform |
| DICOM | Digital Imaging and Communications in Medicine |
| DNA | Deoxyribonucleic Acid |
| DSP | Digital Signal Processor |
| DVD | Digital Versatile Disc |
| DWT | Discrete Wavelet Transform |
| EPROM | Erasable Programmable Read-Only Memory |
| FIR | Finite Impulse Response |
| FPGA | Field Programmable Gate Array |
| FTP | File Transfer Protocol |
| FWT | Forward Wavelet Transform |
| GUI | Graphical User Interface |
| HTTP | Hyper-Text Transport Protocol |
| I/F | Interface |
| I/O | Input/Output |
| IP | Internet Protocol |
| IWT | Inverse Subband/Wavelet Transform |
| JPEG | Joint Photographic Experts Group |
| KLT | Karhunen-Loève Transform |
| LAN | Local Area Network |
| LIS | Laboratory Information System |
| MAC | Media Access Control |
| NIC | Network Interface Card |
| PC | Personal Computer |
| PCA | Principle Component Analysis |
| PSNR | Peak Signal-To-Noise Ratio |
| RAM | Random Access Memory |
| RF | Radio Frequency |
| RGB | Red, Green, Blue |
| ROI | Region of Interest |
| ROM | Read Only Memory |
| SAN | Storage Area Network |
| SMTP | Simple Mail Transfer Protocol |
| TCP | Transmission Control Protocol |
| URL | Uniform Resource Locator |
| WAN | Wide Area Network |
| WSI | Whole Slide Imaging |
| WWAN | Wireless Wide Area Network |

DETAILED DESCRIPTION OF THE INVENTION

The present invention is a method and system of optimized image compression of digital pathology slide images. The optimized image compression mechanism of the invention is operative to exploit the special color properties of the stained tissue represented by the digital pathology slides and to provide an image compression algorithm having improved rate-distortion performance. Optimized color transforms are pre-computed using training sets of pathology slide image scan data for each stain type. The optimized color transforms are used to compress input slide image scans resulting in more efficient image streaming (functioning as a platform for image streaming) enabling users to review extremely large digital slide scans from any connected location, such as in a hospital, satellite center, home or on a mobile telephone.

Pathology Slide Viewing Client/Server System

Figure 1:
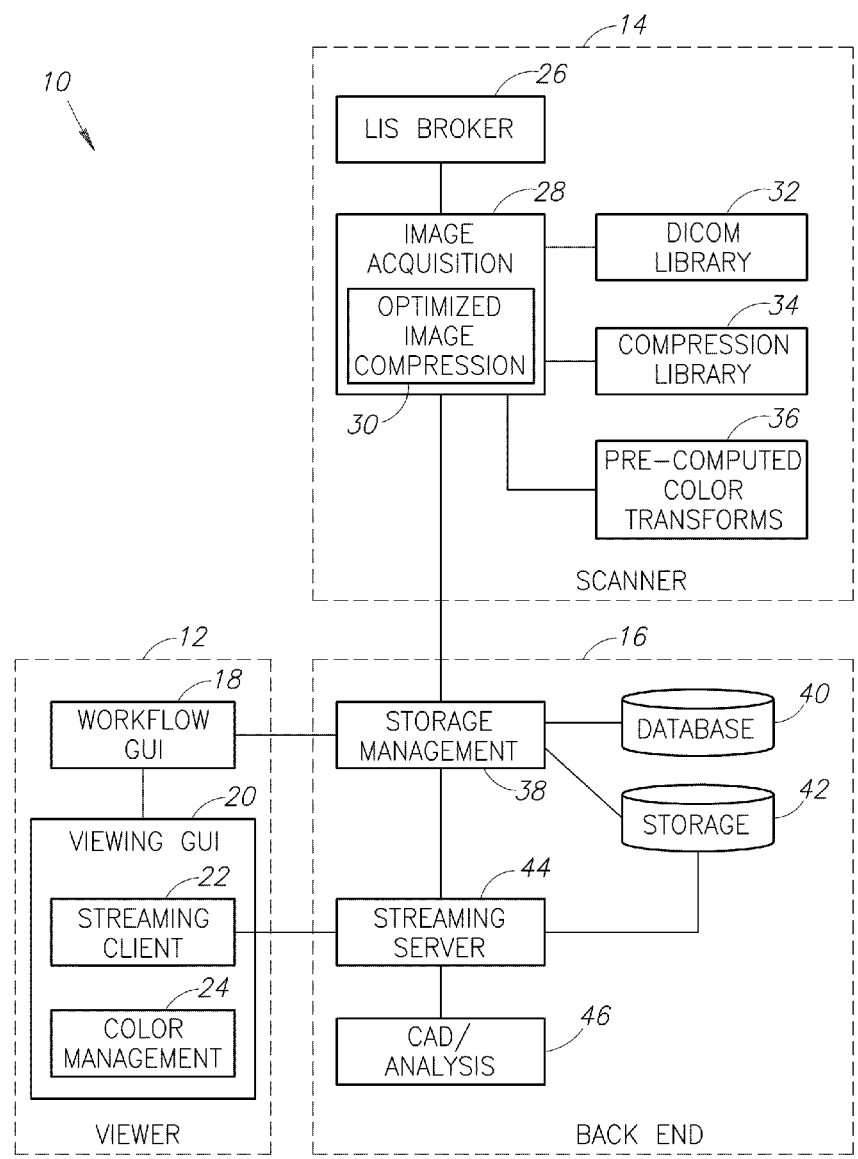
FIG. 1 is a block diagram illustrating a digital pathology system constructed in accordance with the present invention.

A block diagram illustrating a digital pathology system constructed in accordance with the present invention is shown in FIG. 1. The system, generally referenced 10, comprises a viewer station 12, backend 16 and scanner 14. The scanner 14 comprises a Laboratory Information System (LIS) broker 26 image acquisition 28 including optimized image compression module 30, DICOM library 32, compression library 34 and pre-computed color transforms database 36. The backend 16 comprises storage management module 38, database 40, storage 42 for image file storage, streaming server 44 and CAD/analysis block 46. The viewer station 12 comprises workflow GUI 18 and viewing GUI 20 which includes streaming client 22 and color management 24. The viewer station, backend and scanner communicate over any suitable communications means such as the Internet, Intranet, wide area network (WAN), wireless wide area network (WWAN), local area network (LAN), storage area network (SAN), etc. Those having ordinary skill in the art will recognize that any of a variety of communication networks may be used to implement the present invention. The streaming server 44, streaming client 22, storage management 38 and storage 42 communicate with each other using any suitable language/protocol such as SMTP, HTTP, TCP/IP, etc.

In one embodiment, the viewer station 12 and backend 16 may comprise a MAC or PC-type computer operating with an Intel or AMD microprocessor or equivalent. The viewer station 12 and backend 16 may include a cache and suitable storage device (e.g., 42), such as a high-capacity disk, CDROM, DVD, or the like.

The streaming client communicates in the viewer station with the streaming server in the backend over the network and is operative to retrieve imaging data stored in the storage 42.

Note that in one embodiment, the optimized image compression module 30 is implemented in the scanner and the pre-computed color transforms 36 are stored therein. In an alternative embodiment, compression can be implemented on the backend. In this embodiment, the compressed images are generated and stored on the backend and streamed to the viewer for display to the user.

Note also that the optimized image compression and the viewing client functionality may be implemented as plug-ins on a standard web browser. In this embodiment, the web browser comprises imaging client software and optimized image compression software that loads into the browser. The web browser may comprise any suitable browser such as Mozilla Firefox, Apple Safari, Microsoft Internet Explorer, Google Chrome, etc.

In an alternative embodiment, the backend is not present. Rather, the viewer station pulls image data directly from an image storage device (hard drive, etc.) on the scanner and the color transform and image compression calculations and processing is performed on the client computer.

Computer Processing System

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
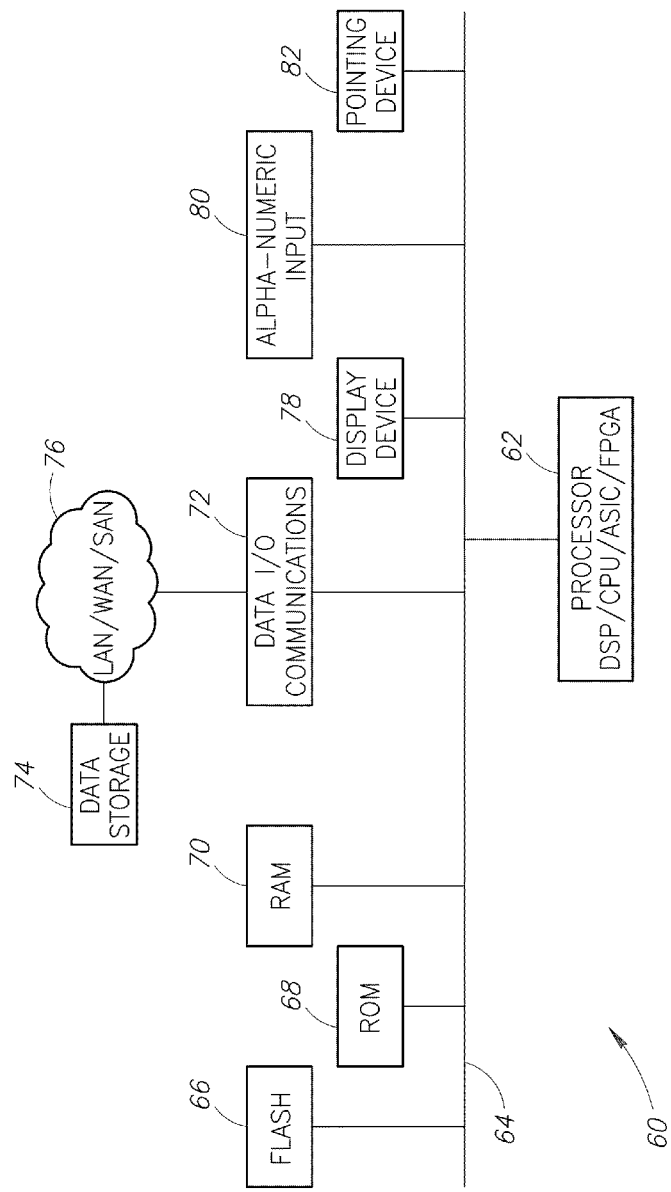
FIG. 2 is a block diagram illustrating an example computer processing system for implementing the mechanism of the present invention.

A block diagram illustrating an example computer processing system for implementing the optimized image compression mechanism of the present invention is shown in FIG. 2. The computer system, generally referenced 60, comprises a processor 62 which may comprise a digital signal processor (DSP), central processing unit (CPU), microcontroller, microprocessor, microcomputer, ASIC or FPGA core. The system also comprises static read only memory 68 and dynamic main memory 70 all in communication with the processor. The processor is also in communication, via bus 64, with a number of peripheral devices that are also included in the computer system. Peripheral devices coupled to the bus include a display device 78 (e.g., monitor), alpha-numeric input device 80 (e.g., keyboard) and pointing device 82 (e.g., mouse, tablet, etc.)

The computer system is connected to one or more external networks such as a LAN/WAN/SAN 76 via communication lines connected to the system via data I/O communications interface 72 (e.g., network interface card or NIC). The network adapters 72 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 74 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the optimized image compression mechanism of the present invention is adapted to reside on a computer readable medium, such as a magnetic disk within a disk drive unit. Alternatively, the computer readable medium may comprise a floppy disk, removable hard disk, flash memory 66, EEROM based memory, bubble memory storage, ROM storage, distribution media, intermediate storage media, execution memory of a computer, and any other medium or device capable of storing for later reading by a computer a computer program implementing the mechanism of this invention. The software adapted to implement the optimized image compression mechanism of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the optimized image compression mechanism of the present invention, and to the extent that a particular system configuration is capable of implementing the system and methods of this invention, it is equivalent to the representative digital computer system of FIG. 2 and within the spirit and scope of this invention.

Once they are programmed to perform particular functions pursuant to instructions from program software that implements the system and methods of this invention, such digital computer systems in effect become special purpose computers particular to the mechanism of this invention. The techniques necessary for this are well-known to those skilled in the art of computer systems.

It is noted that computer programs implementing the system and methods of this invention will commonly be distributed to users on a distribution medium such as floppy disk or CDROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Optimized Image Compression

The present invention has application to the compression of pathology images including image scans of tissue samples that have been stained. Staining is an auxiliary technique that has been in use for a long time in microscopy to enhance contrast in the microscopic image. In biochemistry terms, staining involves adding a class-specific dye (e.g., DNA, proteins, lipids, carbohydrates) to a substrate to qualify or quantify the presence of a specific compound, as is similarly done in fluorescent tagging.

Stains and dyes are frequently used in biology and medicine to highlight structures in biological tissues for viewing, often with the aid of different microscopes. Stains may be used to define and examine bulk tissues (highlighting, for example, muscle fibers or connective tissue), cell populations (classifying different blood cells, for instance), or organelles within individual cells.

The well-known hematoxylin and eosin stain (referred to as H&E stain or HE stain) is a popular staining method in the field of histology. It is the most widely used stain in medical diagnosis; for example, when a pathologist looks at a biopsy of a suspected cancer, the histological section is likely to be stained with H&E and termed H&E section, H+E section, or HE section.

Figure 3:
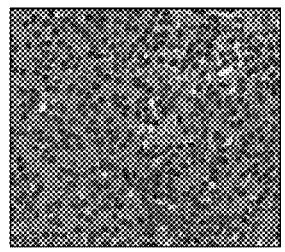
FIG. 3 is an example portion of an H&E stained pathology slide image.

The staining method involves application of (1) the basic dye hematoxylin, which colors basophilic structures with a blue-purple hue and (2) alcohol-based acidic eosin Y, which colors eosinophilic structures bright pink. An example RGB pathology slide image (black and white) of an HE stain tissue sample is shown in FIG. 3. It is evident from the slide image that digital slides containing images of tissues that have been stained by a certain method have the same color characteristics, since the histochemistry process is identical for all slides using the same stain method.

Figure 4:
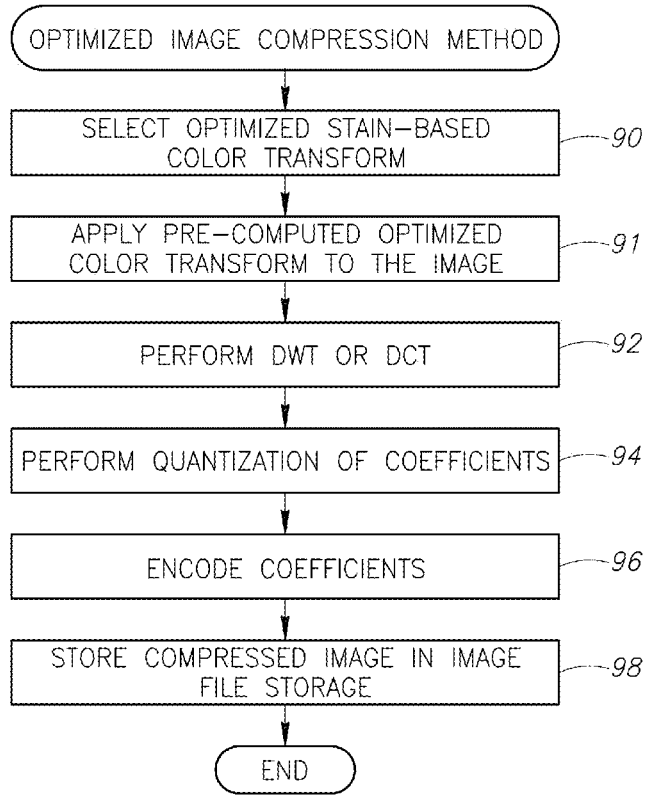
FIG. 4 is a flow diagram illustrating an example optimized image compression method of the present invention.

A flow diagram illustrating an example optimized image compression method of the present invention is shown in FIG. 4. The optimized image compression mechanism uses transform-based image compression algorithms to compress the large original images of slide scans. Before the method is performed, one or more color transforms are pre-computed for various staining techniques. As described in more detail infra, sets of training images are used to pre-calculate color transforms which take the specific color aspects of the particular staining technique into consideration to optimize the compression results.

The first step is to obtain from the pre-computed color transform database the stain method of the given slide. In one embodiment, this data is extracted from the LIS 26 (FIG. 1). The first step is to apply one of the pre-computed optimized color transforms to the input image scan (step 90). A Discrete Wavelet Transform (DWT) or Discrete Cosine Transform (DCT) is then performed on the results of the previous step (step 92). The resulting transform coefficients are then quantized (step 94) and encoded (step 96). The resulting compressed image is stored in an image file storage (step 98).

The image decompression method is based on a reversed sequence of operations from FIG. 4. First, the compressed image is decoded followed by de-quantization of transform coefficients. An inverse DWT or inverse DCT is then applied followed by application of an inverse color transform. The result is an image close to the original (assuming a lossy compression algorithm was used).

Figure 5:
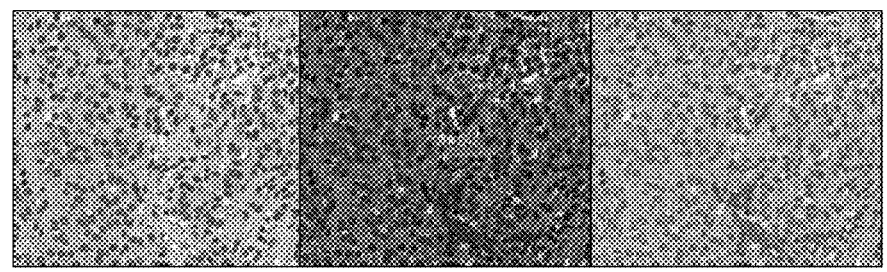
FIG. 5 illustrates the RGB color components of a sample pathology slide.
Figure 6:
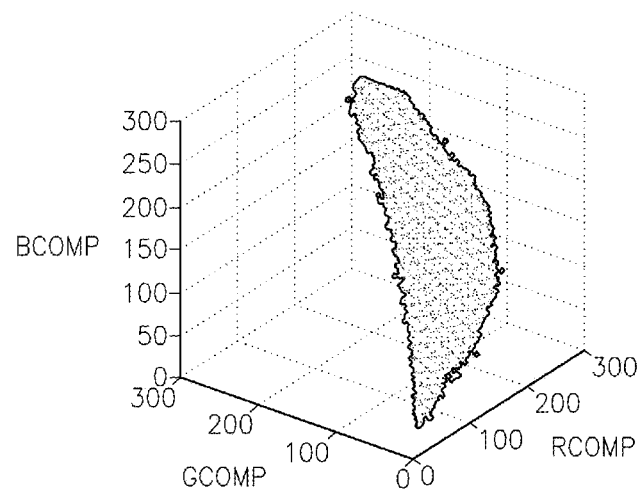
FIG. 6 is an example 3D histogram of a sample pathology slide in RGB color space.

Color Transform and YCbCr Color Space:

The three components of a basic color digital image are red, green and blue (RGB) as depicted in FIG. 5. An example 3D histogram of a sample pathology slide in RGB color space is shown in FIG. 6. Note that there is significant visual correlation between the three RGB components as shown in FIG. 6 which illustrates that the RGB pixel values are essentially well approximated by a lower dimensional surface. Thus, to improve the performance of a compression algorithm, a color transform is used that de-correlates the components.

Any linear color transform can be represented as a non singular 3×3 matrix, as shown below.

$$T: R^3 \to R^3, \begin{pmatrix} \text{Transform} \\ \text{Matrix} \quad 3 \times 3 \end{pmatrix} * \begin{pmatrix} R \\ G \\ B \end{pmatrix} = \begin{pmatrix} x_1 \\ x_2 \\ x_3 \end{pmatrix} \quad (1)$$

Figure 7:
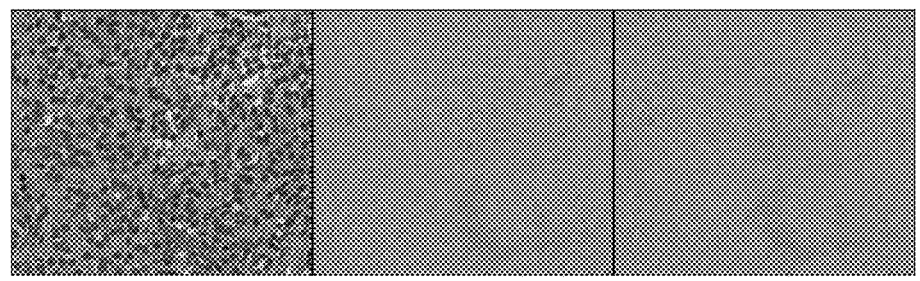
FIG. 7 illustrates the YCbCr components of a sample pathology slide.

One such example is the YCbCr standard compression color space that is widely used as part of the JPEG and JPEG2000 image compression standards and the MPEG video compression standard. The Y component is the luminance component and Cb, Cr are the blue-difference and red-difference chroma components, respectively. The YCbCr components of a sample pathology slide are shown in FIG. 7. As shown, most of the energy in the image is contained in the luminance component. The transform matrix associated with the YCbCr color space is as follows $$\begin{pmatrix} YCbCr \\ \text{Matrix} \end{pmatrix} := \begin{pmatrix} 0.2990 & -0.1687 & 0.0500 \\ 0.5870 & -0.3313 & 0.4187 \\ 0.1140 & 0.5000 & -0.0813 \end{pmatrix} \quad (2)$$

Time-Frequency Transforms:

Two common transforms used in image compression include: (1) the Discrete Cosine Transform (DCT) which expresses a sequence of data points in terms of a sum of cosine functions oscillating at different frequencies; and (2) the Discrete Wavelet Transform (DWT) which is any wavelet transform for which the wavelets are discretely sampled.

In operation, the transforms are applied on the components of the color space separately. In most cases, the number of output time-frequency coefficients is approximately equal to the number of input data samples. The transform, however, produces a 'sparse representation,' i.e., only a small fraction of the coefficients are significant, while the rest have an absolute value below some threshold. The smoother the input data is, the smaller the number of significant coefficients. Therefore, a color transform that, when applied to the RGB data, creates three components where the second and/or third are overall smoother, is favorable to a transform-based image compression algorithm.

Quantization:

Quantization is a lossy compression technique achieved by compressing a range of values to a single quantum value. When the number of discrete symbols in a given stream is reduced, the stream becomes more compressible. For example, reducing the number of colors required to represent a digital image makes it possible to reduce its file size. Specific applications include DCT data quantization in JPEG and DWT data quantization in JPEG 2000.

Coding of the Quantized Coefficients:

In one example embodiment, Arithmetic Coding is used which is a well-known technique for lossless data compression. Normally, a string of characters is represented using a fixed number of bits per character, as in the ASCII code. Similar to Huffman coding, arithmetic coding is a form of variable-length entropy encoding that converts a string into another form that represents frequently used characters using fewer bits and infrequently used characters using more bits, with the expectation of using fewer bits in total.

The mechanism of the present invention is operative to exploit the special color properties of digital pathology slides and improve the rate-distortion performance of an image compression algorithm. Furthermore, the compression algorithm functions as a platform for image streaming and enables users to review the enormous digital slide image files from anywhere, e.g., in the hospital, at a satellite center, at home and even on a mobile phone. This is achieved by combining a principal component analysis (PCA) on training sample sets of digital pathology slides and adaptive choice of quantization steps.

In one embodiment, an optimized color transform is computed in a pre-processing step for a training sample set that is representative of a specific histochemistry staining method of a specific tissue type (e.g., skin, liver, etc.). The corresponding matrix coefficients of this optimized color transform are stored in the database for future use. In one embodiment, a different optimized color transform is computed for each staining method and for each individual laboratory. The color transform is computed on a per staining method and per laboratory basis because often there are subtle differences in the color of tissue stained with the same method but in different locations.

In the example embodiment presented herein, the optimized color transforms are calculated by applying a principle component analysis (PCA) on sets of digital training slide images. A brief overview of the PCA method is provided herein. PCA is a well-known mathematical procedure used to transform a number of possibly correlated variables into a smaller number of uncorrelated variables called principal components. The first principal component accounts for as much of the variability in the data as possible, and each succeeding component accounts for as much of the remaining variability as possible. Depending on the field of application, PCA is also known as the discrete Karhunen-Loève transform (KLT), the Hotelling transform or proper orthogonal decomposition (POD).

PCA is often used as a tool in exploratory data analysis and for making predictive models. It involves the calculation of the eigenvalue decomposition of a data covariance matrix or singular value decomposition of a data matrix, usually after mean centering the data for each attribute. PCA is mathematically defined as an orthogonal linear transformation P: X→Y, that transforms the data to a new coordinate system such that the greatest variance by any projection of the data comes to lie on the first coordinate (called the first principal component), the second greatest variance on the second coordinate, and so on. The transformation P is called a PCA matrix.

PCA is theoretically the optimum transform for given data in least square terms. PCA is often used to reduce the number of dimensions in a data set by retaining those characteristics of the data set that contribute most to its variance. This is achieved by keeping lower-order principal components and ignoring (i.e. discarding) higher-order ones. Such low-order components often contain the most important aspects of the data. Depending on the application, however, this may not always be the case. It is preferable that the redundancy is minimized, by maximizing the variance of the first output component and minimizing the variance of the last.

Figure 14:
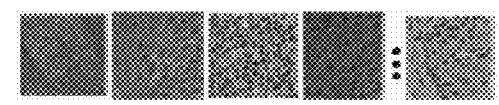
FIG. 14 is a diagram illustrating the PCA matrix calculation for a training set of H&E stain pathology images.

By definition, covariance must be non-negative, thus the minimal covariance is zero. Since in an optimized covariance matrix $C_Y$ all off-diagonal terms are zeros, $C_Y$ must be diagonal. In multiple dimensions this is performed by the following. A flow diagram illustrating an example method of calculating the PCA matrix for a training set is shown in FIG. 14. First, the training set data is collected and an n-dimensional of m-measurements data is formed, expressed as follows $$X := (X_m), \dim(X_m) = n \quad (3)$$

The covariance matrix is computed from this training set vector (step 110). The n×n covariance matrix is then calculated (step 112).

$$C_X = \text{Cov}(X) \quad (4)$$

The eigenvectors P={P$_1$, ..., P$_n$} and eigenvalues {λ$_i$} of the covariance matrix C$_X$ are then calculated (step 112) and normalized (step 114). The eigenvectors are ordered by eigenvalues, λ$_i$≧λ$_{i+1}$ (step 116) and the PCA matrix feature vectors (i.e. components) Y, Y:=PX are constructed (step 118).

Figure 8:
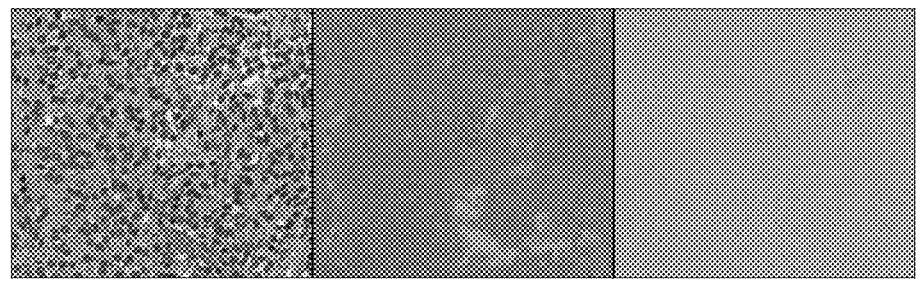
FIG. 8 illustrates the first, second and third PCA color components of a sample pathology slide.
Figure 9:
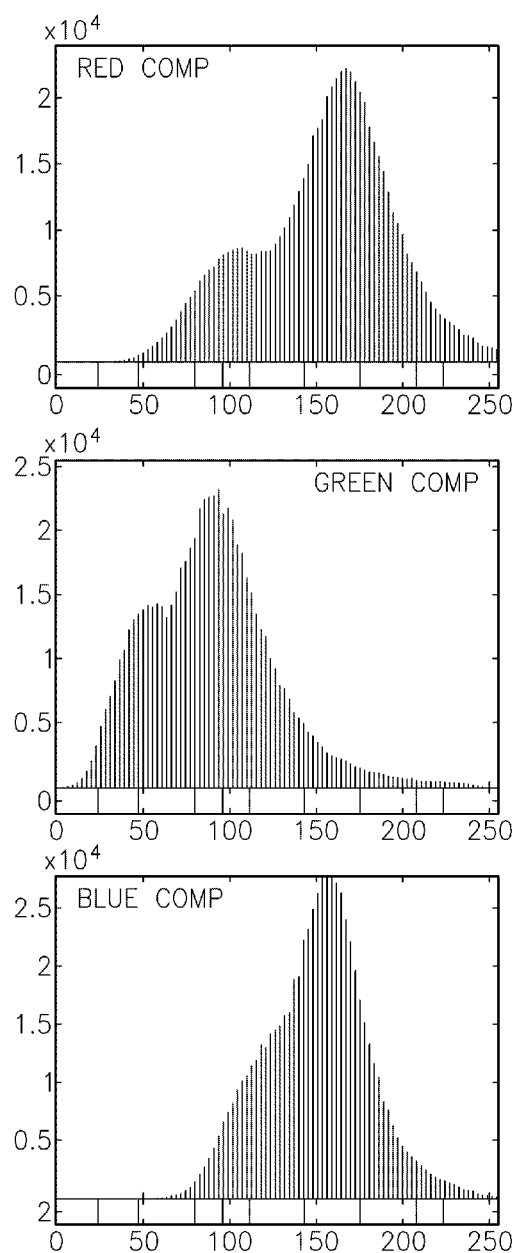
FIG. 9 is an example Red-Green-Blue color component histogram of a sample pathology slide.
Figure 10:
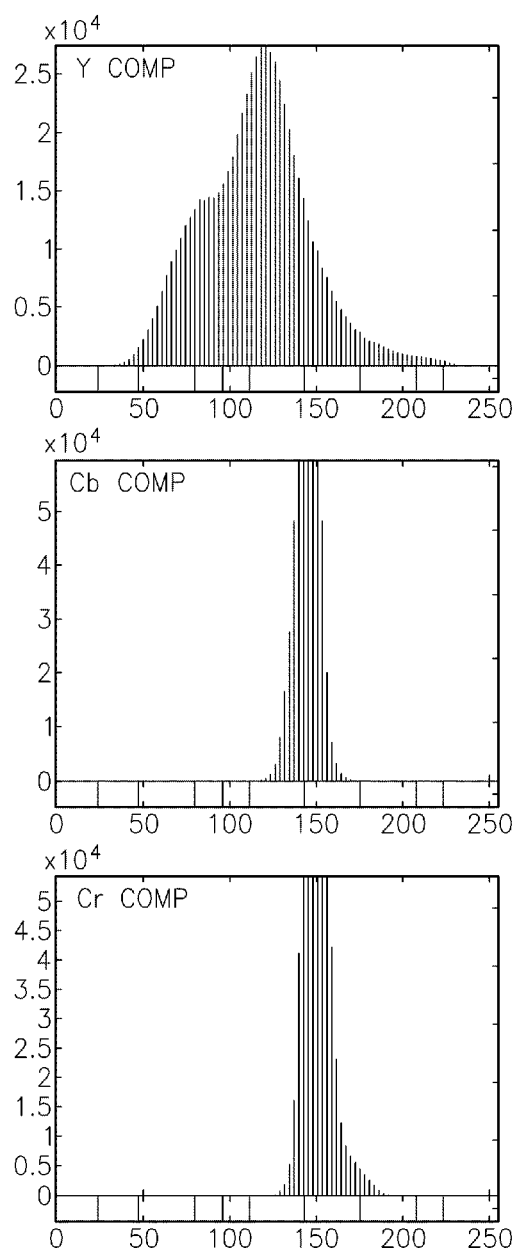
FIG. 10 is an example Y-Cb-Cr color component histogram of a sample pathology slide.
Figure 11:
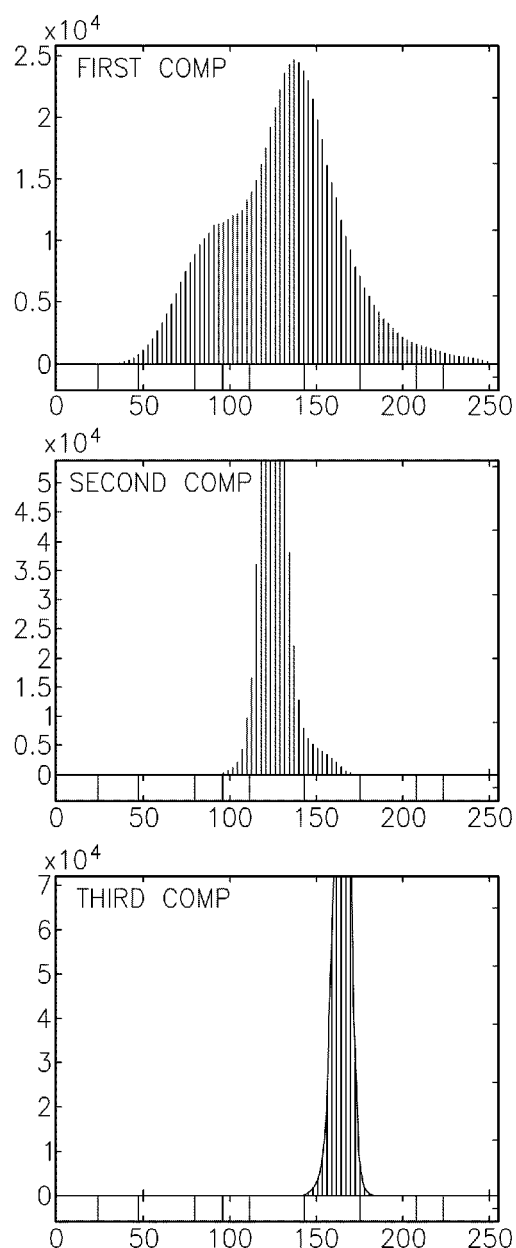
FIG. 11 is an example PCA component histogram of a sample pathology slide.

FIG. 8 illustrates the first, second and third PCA color components of a sample portion of a pathology slide. An example Red-Green-Blue color component histogram of a sample pathology slide is shown in FIG. 9. An example Y-Cb-Cr color component histogram of a sample pathology slide is shown in FIG. 10. An example PCA component histogram of a sample pathology slide is shown in FIG. 11. Note that most of the visual activity of the image is contained in the first component as compared to the RGB component histogram of FIG. 9.

Figure 12:
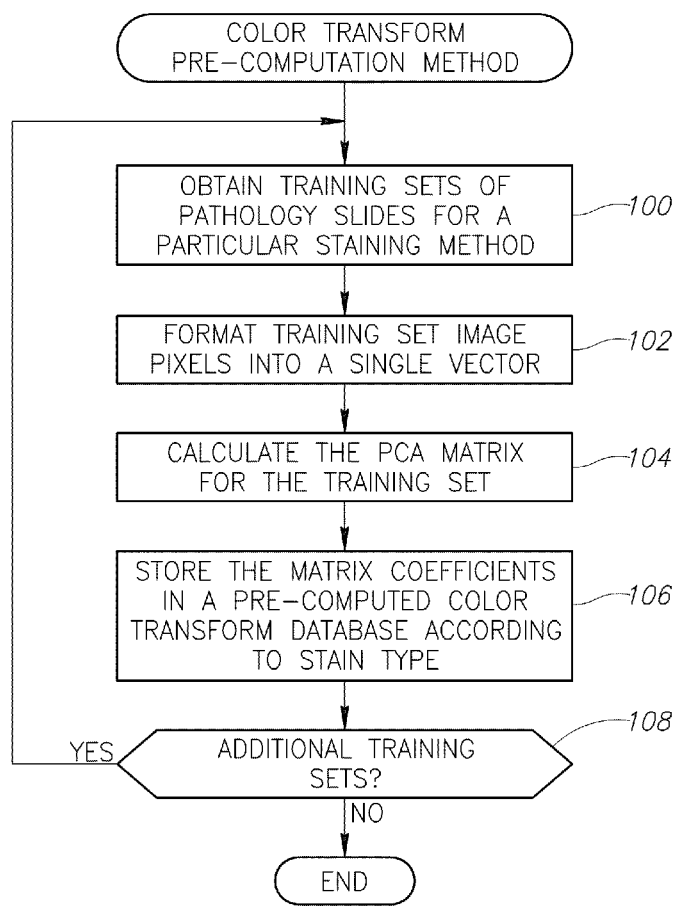
FIG. 12 is a flow diagram illustrating an example method of pre-computing color transforms for different staining methods.

In one embodiment, the PCA technique is used to generate color transforms of pathology images that utilize the same staining method. A flow diagram illustrating an example method of pre-computing color transforms for different staining methods is shown in FIG. 12. The PCA algorithm is used to construct optimized color transforms of pathology images for the purpose of improved de-correlation of the output color components which in turn results in improved overall rate-distortion performance of the compression algorithm. In one embodiment, the method of FIG. 12 is applied in offline mode, i.e. a priori, using one or more training sample sets of pathology images that are representative of a particular staining method for a particular laboratory.

First, one or more training sample sets of stained pathology images are acquired (step 100). Many pathology images from the same stain are collected. In one embodiment, ten H&E stain images are used. It is appreciated that any number of stain images may be used.

The training set image pixels are formatted to build a single large input vector X (step 102). Each element of the vector X is an RGB pixel from the training set of images. The input vector represents the input data for applying PCA. Note that because PCA is a per pixel operation, the order of data is not critical. The collection of RGB pixels form the training set of images is represented by the input vector X which is expressed as $$X := \begin{pmatrix} r_1 & g_1 & b_1 \\ r_2 & g_2 & b_2 \\ \vdots & \vdots & \vdots \\ r_n & g_n & b_n \end{pmatrix} \quad (5)$$

The 3×3 PCA matrix is then calculated using the training set input vector X (step 104). The PCA algorithm is applied to the input vector X. The result is a 3×3 transform matrix which serves as a basis for the stain-based optimized color transform.

The matrix coefficients are then stored in a pre-computed color transform database or other storage according to stain type (step 106). If there are additional training sets (step 108), the steps 100, 102, 104, 106 are repeated.

Figure 13:
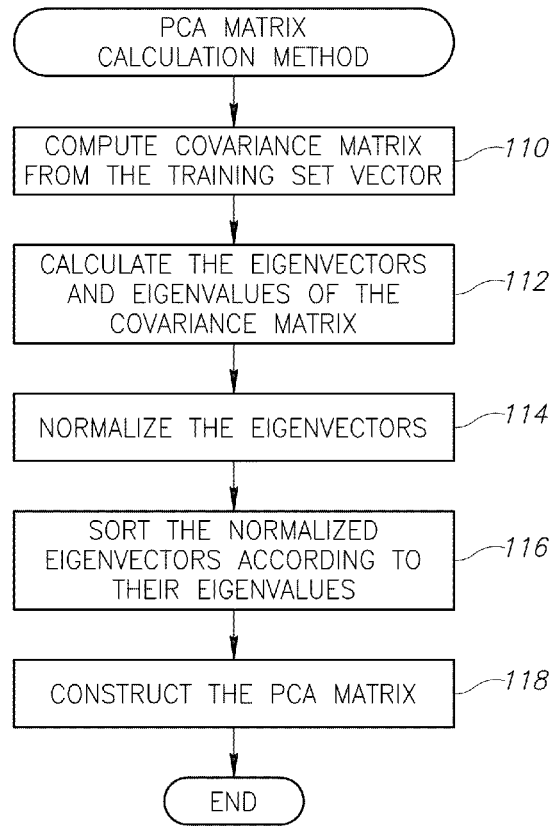
FIG. 13 is a flow diagram illustrating an example method of calculating the PCA matrix for a training set.

A flow diagram illustrating an example method of calculating the PCA matrix for a training set is shown in FIG. 13. The step of calculating the PCA matrix (step 104 of FIG. 12) will now be described in more detail. In a first step, the covariance matrix C$_X$:=Cov(X) of training set X is computed (step 110). This covariance matrix is a symmetric 3×3 matrix where the components of the main diagonal are the variance of each color component (RGB). The non-diagonal components are the covariance of two different components, i.e. the correlation between the distribution of two components.

$$C_X := \begin{pmatrix} \text{var}(r) & \text{cov}(r,g) & \text{cov}(r,b) \\ \text{cov}(r,g) & \text{var}(g) & \text{cov}(g,b) \\ \text{cov}(r,b) & \text{cov}(g,b) & \text{var}(b) \end{pmatrix} \quad (6)$$

The matrix C$_X$ represents dependences between Red-Green-Blue components of the pixels from the training set images.

The eigenvalues λ$_i$ and eigenvectors P$_i$ of covariance matrix C$_X$ are then calculated (step 112). The eigenvalues and eigenvectors can be expressed as $$C_X P_i = \lambda_i P_i, i=1,2,3 \quad (7)$$

Note that the eigenvectors {P$_1$,P$_2$,P$_3$} are an orthogonal basis of the 3D space. They can represent every point of 3D real space, e.g., every RGB pixel x=(r,g,b) can be transformed to a new pixel Px:=(P$_1$x,P$_2$x,P$_3$x).

The eigenvectors are then normalized (step 114) with a special factor σ as follows.

$$\hat{P}_i := \sigma \frac{P_i}{\|P_i\|_2}, \sigma^{-1} := \max\left(\left\|\frac{P_i}{\|P_i\|_2}\right\|_1\right), \quad (8)$$
$$i = 1, 2, 3 \Rightarrow \|P_i\| = \sigma, 0 < \sigma \leq 1$$

The transform is normalized so as to limit output values of the optimized color transform to a precision range of one byte, i.e. 0≦‖P$_i$X‖≦255.

The normalized eigenvectors $\hat{P}_i$ are then sorted by eigenvalues λ$_i$ (step 116). Assuming λ$_1$>λ$_2$>λ$_3$>0, the optimized color transform matrix is then constructed (step 118). It is defined by $$\begin{pmatrix} PCA \\ \text{Matrix} \end{pmatrix} := \begin{pmatrix} \hat{P}_i & \hat{P}_2 & \hat{P}_3 \end{pmatrix} \quad (9)$$

Figure 15:
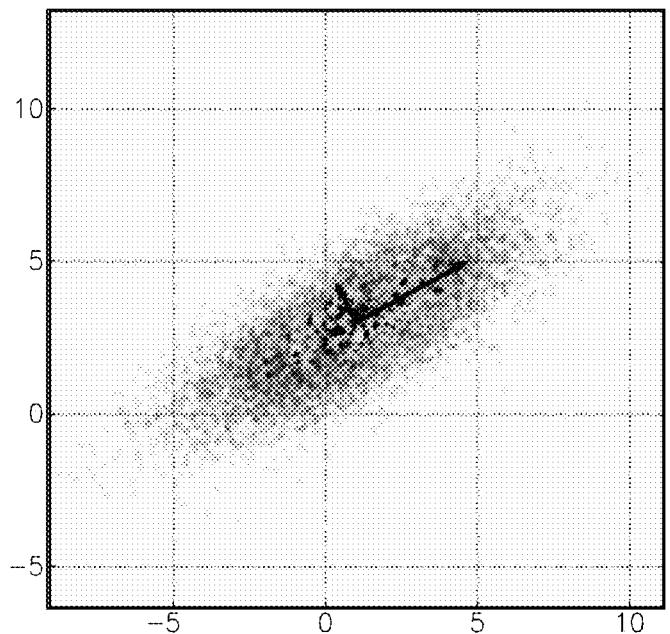
FIG. 15 is a diagram illustrating the PCA of an example 2D set multivariate Gaussian distribution.

Note that the eigenvalues are now the variance of the new color components. A diagram illustrating an example PCA matrix calculation for a training set of HE stain pathology images is shown in FIG. 14. A diagram illustrating the PCA of an example 2D set multivariate Gaussian distribution is shown FIG. 15.

To illustrate the principles of the invention, the optimized stain-based color transform for H&E stain is as follows $$\begin{pmatrix} PCA \\ \text{Matrix} \end{pmatrix} := \begin{pmatrix} 0.3887 & 0.4284 & 0.0904 \\ 0.3548 & -0.2373 & -0.4007 \\ 0.2565 & -0.3208 & 0.4172 \end{pmatrix} \quad (10)$$

For comparison, the standard YCbCr transform matrix is as follows $$\begin{pmatrix} YCbCr \\ \text{Matrix} \end{pmatrix} := \begin{pmatrix} 0.2990 & -0.1687 & 0.0500 \\ 0.5870 & -0.3313 & -0.4187 \\ 0.1140 & 0.5000 & -0.0813 \end{pmatrix} \qquad (11)$$

Figure 16:
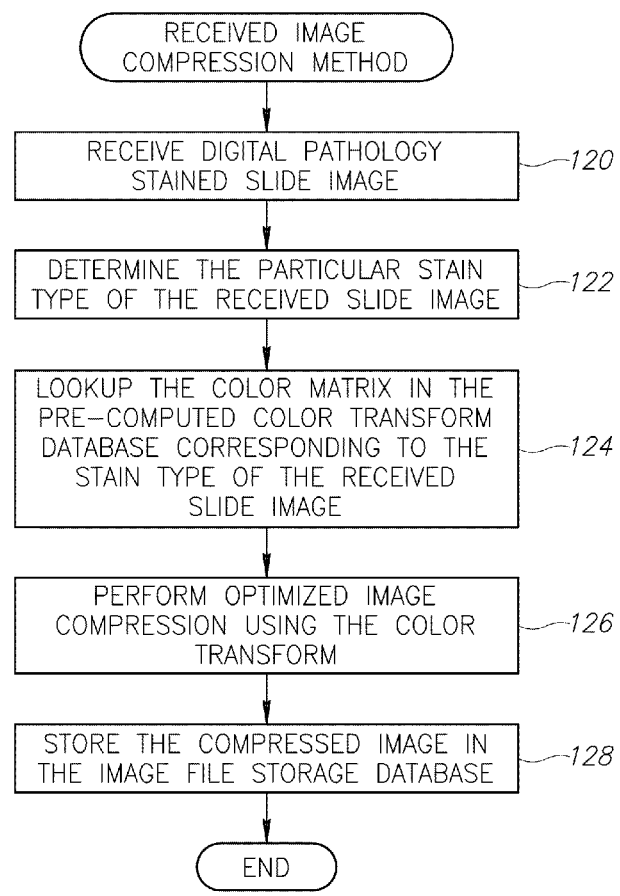
FIG. 16 is a flow diagram illustrating an example received image compression method.

Once the optimized color transforms are pre-computed and stored in the database, they can be used in the compression of input images. A flow diagram illustrating an example received image compression method is shown in FIG. 16. For each new scanned slide received (step 120), information on the tissue type and staining method that was applied at the time the specimen was processed is determined (e.g., read from the specimen tag or label) (step 122). A lookup of the color transform (i.e. matrix) corresponding to the stain type of the specimen slide is then performed using the pre-computed color transform database 36 (FIG. 1). If the color transform is found, the coefficients of the pre-computed color transform that was optimized for this staining method are read from the database. In one embodiment the optimized color transform is different for each processing laboratory location.

Once an input image is mapped to a certain type of stain (these parameters are known at the time of image acquisition) the corresponding pre-calculated color PCA matrix for the particular stain is retrieved and applied to the input image as a pre-processing step in the compression algorithm. The pixel data of the received image is transformed using the optimized color transform matrix, as shown below $$\begin{pmatrix} r \\ g \\ b \end{pmatrix} \mapsto \begin{pmatrix} r \\ g \\ b \end{pmatrix} * \begin{pmatrix} PCA \\ \text{matrix} \end{pmatrix} \qquad (12)$$

Optimized image compression is then performed using the pre-processed input image (step 126). The resulting compressed image is stored in an image file storage (step 128).

Note that for each given stained-based optimized color transform, the selection of quantization steps for the transform coefficients is based on the properties of the color transform matrix such as the expected variance of color channel values. The quantization steps for the time-frequency transform step of the image compression process are determined based on the fact that the energy (i.e. information) in the first PCA principle component is greater or equal to the energy in the second PCA component which is greater or equal to the third PCA component. Therefore to obtain the best rate-distortion performance, the smallest quantization step is chosen for the first PCA component, a larger quantization step for the second PCA component and the largest quantization step for the third PCA component.

Thus, the finest quantization steps are used to quantize the first PCA component the coarsest steps are used to quantize the third PCA component. This leads to a significant improvement in the overall rate-distortion performance of the image compression process.

To illustrate the benefits of the invention, the results for the rate-distortion performance for YCbCr and PCA transforms for an example embodiment are provided in Table 1 of FIG. 17. The table incorporates the results of experiments performed by the inventors with the well-known Kakadu JPEG2000 toolkit with YCbCr color transform and a stained-based color transform. In this experiment relatively two large H&E digital stain images were selected. As shown in the table, in both cases, for two different bit-rates and for the same bit rate use of the optimized image compression mechanism yields a significant improvement in quality of 0.33 to 0.41 dB in PSNR.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of one or more embodiments of the invention. The embodiments were chosen and described in order to best explain the principles and the practical application, and to enable others of ordinary skill in the art to understand the one or more embodiments of the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of image compression, said method comprising the steps of:
   pre-computing a plurality of color transforms, each color transform computed in accordance with a set of training images comprising sample specimen pathology slide scan images; and
   compressing an input digital image slide scan utilizing one of said color transforms.

2. The method according to claim 1, wherein said color transforms are computed using principle component analysis (PCA).

3. The method according to claim 1, wherein said plurality of color transforms are stored in a database.

4. The method according to claim 1, wherein each set of training images corresponds to a different pathology slide stain type.

5. The method according to claim 1, further comprising selecting quantization steps for a time-frequency transformation in accordance with the principle components of each color transform.

6. The method according to claim 5, wherein a smallest quantization step is applied to a first principle component, a next larger quantization step is applied to a second principle component, and a largest quantization step is applied to a third principle component.

7. A method of compressing digital pathology stained images, said method comprising the steps of:
   pre-computing a plurality of color transforms, each color transform computed in accordance with a set of training slide images corresponding to a particular stain and comprising sample specimen pathology slide scan images;
   mapping an input digital image slide scan to a particular stain; and compressing said input digital image scan utilizing a pre-computed color transform corresponding to said mapped stain.

8. The method according to claim 7, wherein said color transforms are computed using principle component analysis (PCA).

9. The method according to claim 7, wherein mapping of an input digital image to a particular stain is based on information read from a laboratory information system (LIS).

10. The method according to claim 7, further comprising selecting quantization steps for a time-frequency transformation in accordance with the principle components of each color transform.

11. The method according to claim 10, wherein a smallest quantization step is applied to a first principle component, a next larger quantization step is applied to a second principle component, and a largest quantization step is applied to a third principle component.

12. A server computer for performing image compression of digital pathology slide scans, comprising:
an image storage device adapted to store a plurality of pathology slide scans; and
an image compression module for mapping an input slide scan digital image to a particular stain and compressing said input digital image utilizing a pre-computed color transform corresponding to said mapped stain, wherein color transforms are pre-computed, each color transform computed in accordance with a set of training images corresponding to a particular stain and comprising sample specimen pathology slide images.

13. The server according to claim 12, wherein said color transforms are computed using principle component analysis (PCA).

14. The server according to claim 12, said image compression module further comprising means for selecting quantization steps for a time-frequency transformation in accordance with the principle components of each color transform.

15. The server according to claim 14, wherein a smallest quantization step is applied to a first principle component, a next larger quantization step is applied to a second principle component, and a largest quantization step is applied to a third principle component.

16. A method of computing optimized color transforms for use in compressing digital pathology slide scans, said method comprising the steps of:
receiving sample stain data from a set of training slide scans comprising sample pathology specimens representative of a particular histochemistry staining method of a particular tissue type;
forming an input vector from said sample stain data; and
for each training slide set, calculating a color transform utilizing said input vector and storing the resulting matrix coefficients in a database.

17. The method according to claim 16, wherein said color transforms are computed using principle component analysis (PCA).

18. The method according to claim 16, further comprising the steps of:
determining a stain type for an input digital pathology image;
retrieving a color transform corresponding to said stain type from said database; and
utilizing said color transform in compressing said input digital pathology image.

19. The method according to claim 16, further comprising the steps of:
determining a stain type for an input digital pathology image;
retrieving a color transform corresponding to said stain type from said database; and
applying a smallest quantization step to a first principle component of said color transform, applying a next larger quantization step to a second principle component of said color transform, and applying a largest quantization step to a third principle component of said color transform.

20. The method according to claim 16, wherein said step of calculating a color transform from a training slide set comprises the steps of:
calculating a covariance matrix of said training slide set;
calculating eigenvectors and eigenvalues of said covariance matrix;
normalizing said eigenvectors by said eigenvalues; and
sorting said normalized eigenvectors by said eigenvalues.

21. A computer program product characterized by that upon loading it into computer memory a digital pathology stained image compression process is executed, the computer program product comprising:
a non-transitory computer usable medium having computer usable program code embodied therewith, the computer usable program code comprising:
computer usable code configured to pre-compute a plurality of color transforms, each color transform computed in accordance with a set of training slide images corresponding to a particular stain;
computer usable code configured to map an input digital image to a particular stain; and
computer usable code configured to compress said input digital image utilizing a pre-computed color transform corresponding to said mapped stain.

* * * * *